United States Patent Office 2,824,866
Patented Feb. 25, 1958

2,824,866

DISAZO DYESTUFFS AND THEIR METAL COMPLEX COMPOUNDS

Hans Ischer and Lukas Schneider, Basel, Switzerland, assignors, by mesne assignments, to Saul & Co., Newark, N. J., as nominee of Fidelity Union Trust Company, executive trustee under Sandoz trust No Drawing. Application December 13, 1954
Serial No. 474,970

Claims priority, application Switzerland
December 18, 1953

7 Claims. (Cl. 260—148)

The present invention relates to valuable disazo dyestuffs and their metal complex compounds.

It is known from the U. S. Patent No. 2,623,873, that the individual members of a new group of disazo dyestuffs are obtained by coupling an appropriate diazotized aminoazo dyestuff which corresponds to the formula

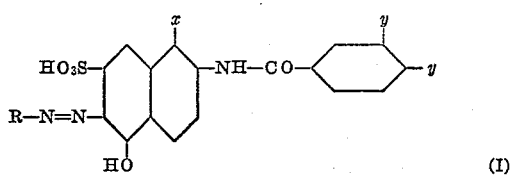

wherein R represents an aromatic radical of the benzene or napthalene series which, in ortho-position to the azo group, bears a substituent which is capable of metal complex formation, $x$ stands for H or $SO_3H$, one $y$ stands for $CH_3$, and the other $y$ stands for $NH_2$, with an aminohydroxy-naphthalene sulfonic acid which corresponds to the formula

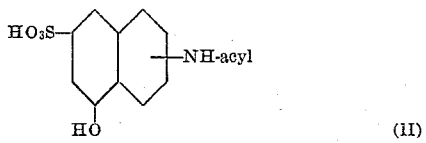

wherein the naphthalene nucleus may carry a further $SO_3H$ group.

It has now been found that also valuable disazo dyestuffs and their metal complex compounds are obtained, when using as aminoazo dyestuffs of Formula I for the preparation of the diazo compounds, aminoazo dyestuffs wherein $x$ is a chlorine atom, and R stands for the radical of an aminobenzene which bears an alkylsulfonyl-, cycloalkylsulfonyl-, aralkylsulfonyl- or arylsulfonyl group (for example —$SO_2.CH_3$, —$SO_2C_6H_{11}$, —$SO_2.CH_2.C_6H_5$, —$SO_2C_6H_5$) and also carries, in ortho-position to the amino group a substituent which is capable of metal complex formation (for example —OH, —$OCH_3$, —COOH, —$OCH_2$—COOH), and/or as end-positioned azo components (a) asymmetric ureas which correspond to the formula

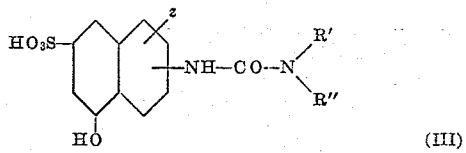

wherein R' stands for hydrogen, alkyl, cycloalkyl, aralkyl or aryl, R" stands for hydrogen or alkyl, and $z$ stands for hydrogen, chlorine or —$SO_3H$, or (b) compounds of the aliphatic or heterocyclic series which are capable of coupling because of the presence of the enol grouping —C(OH)=CH—, or (c) couplable compounds selected from the series consisting of hydroxybenzenes, hydroxynaphthalenes, and hydroxynapthalene sulfonic acids which are free from acylamino groups, which compounds couple in ortho-position to the hydroxy group.

The new disazo dyestuffs correspond, in metal-free state, to the formula

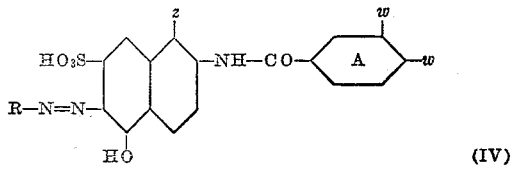

wherein R stands for an aromatic radical of the benzene or napthalene series which, in ortho-position to the azo group, bears a substituent which is capable of metal complex formation, $z$ stands for hydrogen, chlorine or $SO_3H$, one $w$ stands for $CH_3$ and the other $w$ stands for the radical of an azo component connected with nucleus A by an azo bridge, which azo component radical—when R is the radical of an aminobenzene which carries an alkysulfonyl-, cycloalkylsulfonyl-, aralkylsulfonyl- or arylsulfonyl group and, in ortho-position to the amino group, a substituent which is capable of metal complex formation—corresponds to the formula

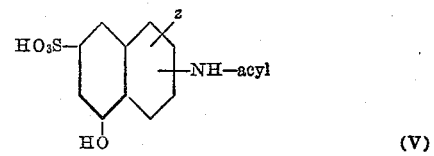

wherein $z$ has the aforesaid significance, or is a radical of Formula III, or the radical of a compound of the aliphatic or heterocyclic series which is capable of coupling because of the presence of the enol group —C(OH)=CH—, or is the radical of a couplable compound selected from compounds of the series consisting of hydroxybenzenes, hydroxynaphthalenes and hydroxynaphthalene sulfonic acids which are free from acylamino groups, which compounds couple in ortho-position to the hydroxy group, and—when R stands for the radical of an aminobenzene which contains, in ortho-position to the amino group, a substituent which is capable of metal complex formation, but is free from alkylsulfonyl-, cycloalkylsulfonyl-, aralkylsulfonyl- or arylsulfonyl groups—is a radical of Formula III, or the radical of a compound of the aliphatic or heterocyclic series which is capable of coupling because of the enol grouping —C(OH)=CH—, or the radical of a couplable compound selected from compounds of the series consisting of hydroxybenzenes, hydroxynaphthalenes and hydroxynaphthalene sulfonic acids which are free from acylamino groups, which compounds couple in ortho-position to the hydroxy group.

The new disazo dyestuffs, when they are in the metal-free state, dye cotton and fibers of regenerated cellulose in orange, red to violet shades, which are rendered fast to washing and to light by treatment with metal-yielding, for example copper-yielding agents. In so far as solubility permits, the disazo dyestuffs can also be converted in substance in per se known manner into the corresponding metal complex compounds, particularly into the copper and nickel complex compounds, whereby very light-fast direct dyestuffs are obtained. These also dye the aforesaid fibers in orange, red to violet shades which are fast to washing and to light. With respect to the comparable products of the aforesaid patent, the disazo dyestuffs of the present invention possess in part essentially improved solubility in water. Their dyeings are characterized, relative to those of the known dyestuffs by clearer tones and in part by better fastness to washing. It is possible to favorably influence the dyeing properties of the dyestuff by using them in the form of mixtures. Thus, for example, a mixture of 60 parts by weight of the disazo dyestuff disclosed in Example 28, infra, with 40 parts by weight of the disazo dyestuff according to Example 30 infra has somewhat superior dyeing properties as compared with the individual components.

The new dyestuffs are advantageously prepared by coupling the indirectly diazotized aminoazo dyestuffs with the azo components, preferably in weakly alkaline medium.

Typical presently-preferred embodiments of the invention are set forth by way of illustration in the following examples. In these examples, parts are by weight, percentages are by weight, and temperatures are in degrees centigrade.

EXAMPLE 1

59 parts of the monosidium salt of the aminoazo dyestuff, obtained by alkaline coupling of diazotized 1-hydroxy-2-amino-4-methylsulfonylbenzene with 2-(3'-methyl-4'-amino)-benzoylamino-5-hydroxynaphthalene-7-sulfonic acid, are dissolved in 1100 parts of water with addition of 20 parts of aqueous sodium hydroxide solution of 30% strength. 24 parts of aqueous sodium nitrite solution of 30% strength are added to the resultant solution, which is then cooled to a temperature of 5° by means of ice, after which 100 parts of hydrochloric acid of 30% strength are quickly run in while stirring thoroughly. After stirring the mixture for 6 hours at a temperature of 10–15°, the diazotization is finished; the resultant suspension is then combined in the presence of excess sodium carbonate with an aqueous solution of 39 parts of sodium 2-benzoylamino-5-hydroxynaphthalene-7-sulfonate. The new disazo dyestuff forms instantaneously. It is precipitated from the hot solution by means of sodium chloride, and is then filtered off and dried. It is a dark powder which dissolves in water and in concentrated sulfonic acid with blue-red coloration. The new dyestuff, which corresponds to the formula

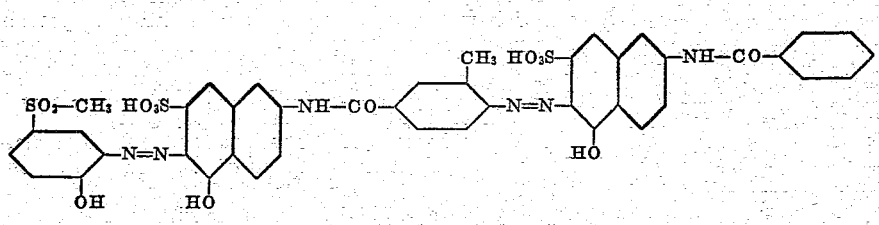

dyes cotton and fibers of regenerated cellulose by the after-coppering process in red shades of good fastness to light and to washing.

EXAMPLE 2

97.2 parts of the disazo dyestuff, obtained according to the data of Example 1 by coupling diazotized 1-hydroxy-2-amino-4-methylsulfonylbenzene with 2-(3'-methyl-4'-amino)-benzoylamino-5-hydroxynaphthalene-1,7-disulfonic acid, followed by further diazotization of the resultant aminomonoazo dyestuff and coupling with 2-carbethoxyamino-5-hydroxynaphthalene-7-sulfonic acid, are dissolved in 3000 parts of water at 80°. The solution is rendered alkaline by means of 100 parts of aqueous ammonia of 25% strength and then at 80° and in the course of 30 minutes a solution of 25 parts of crystalline copper sulfate in 100 parts of water is run in. The copper complex formation of the o,o'-dihydroxyazo dyestuff takes place very rapidly. The new dyestuff which corresponds to the formula

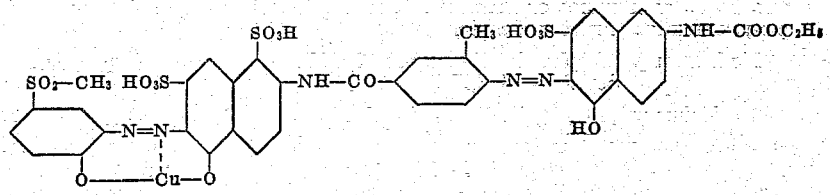

is thereupon salted out, filtered off and dried. It dissolves with red coloration in water and dyes cotton and fibers of regenerated cellulose in bluish red shades of excellent fastness to light and good fastness to washing. The latter can be further improved by an after treatment of the dyeings with an optionally basic, cation-active copper complex compound.

A metalliferous disazo dyestuff which is even faster to washing is obtained when, in the present example, the metallization of the disazo compound is carried out with 15.5 parts of nickel sulfate instead of 25 parts of copper sulfate.

EXAMPLE 3

The aminoazo dyestuff, obtained by coupling 18.7 parts of diazotized 1-hydroxy-2-amino-4-methylsulfonylbenzene with 45.2 parts of 2-(3'-methyl-4'-amino)-benzoylamino-5-hydroxynaphthalene-1,7-disulfonic acid in a medium rendered alkaline with sodium bicarbonate is stirred into 300 parts of water. 7 parts of sodium nitrite are added to the suspension, after which 30 parts of hydrochloric acid of 30% strength are added all at one time at 8° and while stirring thoroughly. The diazotization is terminated in about 2 hours. The obtained diazo suspension is run, at 10–15°, into a solution of 41.5 parts of 5-hydroxy-7-sulfonaphthyl(2)-carbaminic acid-(4'-acetylamino)-phenylamide and 40 parts of sodium carbonate in 500 parts of water. The coupling to form the disazo dyestuff takes place very rapidly. At the end of 2 hours, the disazo dyestuff is salted out of the solution and is then filtered off.

For conversion thereof into the copper complex compound, the obtained dyestuff is dissolved in 3000 parts of water at 80°. The solution is cooled down to 50–60°, 200 parts of aqueous ammonia of 25% strength are added, and while maintaining the last mentioned temperature of solution of 25 parts of crystalline copper sulfate in 500 parts of water is added in the course of 30 minutes. As soon as excess copper sulfate can be detected in a salted-out test specimen, the resultant copper complex compound of the disazo dyestuff is precipitated from the metallization solution by the addition of 300 parts of sodium chloride, and is then filtered off and dried under reduced pressure at 90°. The copper-containing disazo dyestuff which corresponds to the formula

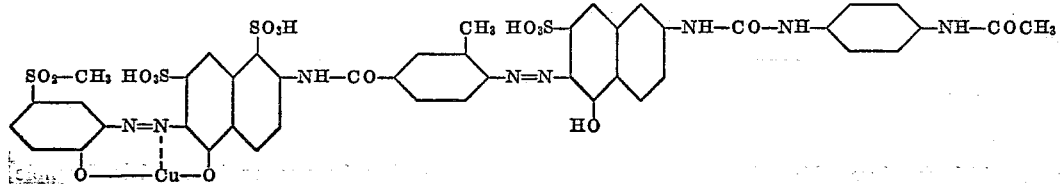

is soluble with red coloration in water and dyes cotton and fibers of regenerated cellulose in red shades of excellent fastness to light and good fastness to washing. The latter can be further improved by after treating the dyeings with an optionally basic, cation-active copper complex compound.

perature 30 parts of concentrated hydrochloric acid are added and the mixture stirred for about 2 hours. The obtained diazo suspension is then run, at 5 to 10°, into a solution of 41.5 parts of 5-hydroxy-7-sulfonaphthyl(2)-carbaminic acid-4'-acetylamino)-phenylamide and 40 parts of sodium carbonate in 500 parts of water. The coupling proceeds very rapidly; after 2 hours the mass is warmed to 70°, and the disazo dyestuff which has gone into solution and which corresponds to the formula

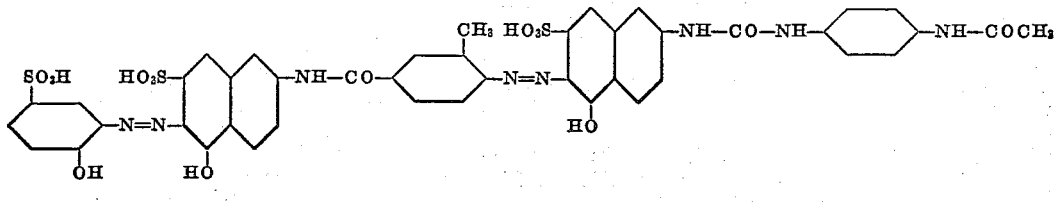

EXAMPLE 4

In order to prepare the nickel complex compound of the diazo dyestuff according to Example 3, a process analogous to that employed in the coppering is carried out. The disazo dyestuff is dissolved in 3000 parts of water at 80°. After cooling the solution to 60°, 200 parts of aqueous ammonia of 25% strength are added and then, at the same temperature, a solution of 15.5 parts of nickel sulfate in 100 parts of water is run in. The nickel complex compound of the disazo dyestuff forms very rapidly, as can be observed by the change of the color of the solution from violet-red to red. Upon completion of the addition of the nickel sulfate solution, the nickel-containing disazo dyestuff is salted out, filtered off and dried. It corresponds to the formula is salted out with 50 parts of sodium chloride, filtered off and dried at 90° under reduced pressure. It is a red-brown powder which dissolves with red coloration in water and dyes cotton and fibers of regenerated cellulose in clear red shades which are changed to red-violet by aftertreatment with copper salts and thereupon become fast to washing and to light.

The disazo dyestuff prepared according to the present example can also be converted in substance into a water soluble metal complex compound, especially into the copper or nickel complex compound, which dyes cellulose fibers in blue-red shades which are very fast to light.

EXAMPLE 6

The aminoazo dyestuff, obtained by coupling 18.7 parts

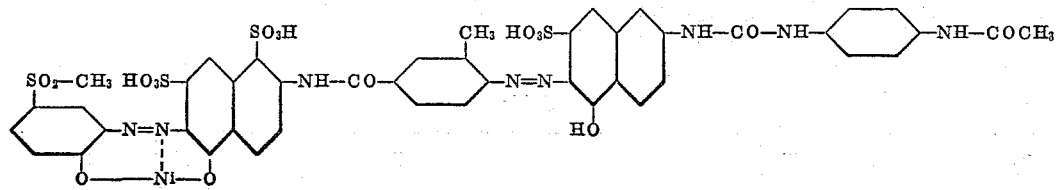

and dissolves with red coloration in water and dyes cotton and fibers of regenerated cellulose in brownish red shades with excellent fastness to light and good fastness to washing, which latter can be further improved by aftertreating the dyeing with an optionally basic, cation-active copper complex compound.

EXAMPLE 5

The aminoazo dyestuff, obtained by coupling 18.9 parts of diazotized 1-hydroxy-2-aminobenzene-4-sulfonic acid with 37.2 parts of 2-(3'-methyl-4'-amino)-benzoylamino-5-hydroxynaphthalene-7-sulfonic acid in a medium rendered alkaline with sodium carbonate is stirred into 400 parts of water. 7 parts of sodium nitrite are added to the suspension which is then cooled to 8°. At this temof diazotized 1-hydroxy-2-amino-4-methylsulfonylbenzene with 37.2 parts of 2-(4'-amino-3'-methyl)-benzoyl-amino-5-hydroxynaphthalene-7-sulfonic acid in a medium rendered alkaline with sodium carbonate, is stirred into 400 parts of water. 7 parts of sodium nitrite are added to the suspension, and the latter is then cooled to 6–8°. At this temperature and while stirring, 30 parts of concentrated hydrochloric acid are added and stirring is continued for approximately 2 hours. The diazo suspension is then run, at 15–20°, into a solution of 15 parts of 2-hydroxynaphthalene, 6 parts of sodium hydroxide and 30 parts of sodium carbonate in 400 parts of water. The disazo dyestuff forms very rapidly. It is salted out of the warm solution by the addition of sodium chloride and is then filtered off and dried at 90° under reduced pressure. The new dyestuff which corresponds to the formula

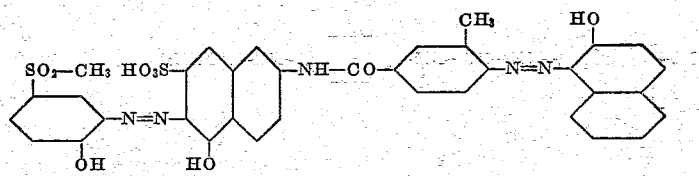

is a black powder which dissolves with red coloration in water and dyes cotton and fibers of regenerated cellulose by the after-coppering process in light-fast red shades.

EXAMPLE 7

The aminoazo dyestuff, obtained by coupling 18.7 parts of diazotized 1-hydroxy-2-amino-4-methylsulfonylbenzene with 37.2 parts of 2-(4'-amino-3'-methyl)-benzoylamino-5-hydroxynaphthalene-7-sulfonic acid in a medium rendered alkaline with sodium carbonate, is stirred into 400 parts of water and then diazotized in accordance with the data of the preceding example. The diazo suspension is then run, at 15–20°, into a solution of 30.5 parts of 1-hydroxynaphthalene-3,8-disulfonic acid and 40 parts of sodium carbonate in 500 parts of water. The disazo dyestuff forms very rapidly. At the end of about 2 hours it is precipitated from the warm solution by the addition of sodium chloride and is then filtered off.

For conversion thereof into the copper complex compound, the process according to Example 3 is followed. The resultant copper-containing disazo dyestuff corresponds to the formula

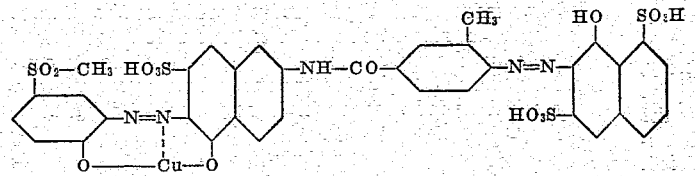

and dissolves in water with red coloration and dyes cotton and fibers of regenerated cellulose in red shades of excellent fastness to light and good fastness to washing. The latter property can be further considerably improved by aftertreating the dyeings with an optionally basic, cation-active copper complex compound.

The nickel complex compound of the disazo dyestuff can be prepared after the manner described in Example 4. It corresponds to the formula

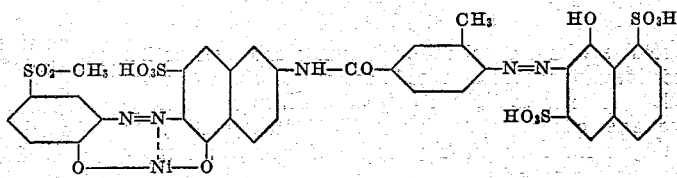

dissolves with red coloration in water, and dyes cotton and fibers of regenerated cellulose in red shades with good fastness to light and to washing. The latter property can be considerably improved by aftertreating the dyeings with an optionally basic, cation-active copper complex compound.

Additional disazo dyestuffs obtainable according to the present invention are set forth in summarized form in the following table. The said disazo dyestuffs are characterized in such table by the aminoazo dyestuffs (column 2) and azo components (column 3) used in making the dyestuffs, and also by the shade (column 5) of the dyeings prepared with the new dyestuffs. These disazo dyestuffs are brought onto the fiber either by the single-bath or two-bath coppering process, or—where their solubility in water permits—they are used for dyeing in the form of their copper or nickel complex compounds. Disazo dyestuffs which are designated by A in column 4, are those which are coppered on the fiber. B designates the disazo dyestuffs which are coppered in substance, while C designates nickel complex compounds. For the sake of simplicity, the 2-(4'-amino-3'-methyl)-benzoylamino - 5 - hydroxynaphthalene - 7-sulfonic acid, which is used in most cases for making the aminoazo dyestuff of Formula I, is designated as AMBOS.

*Table*

| Ex. No. | (2) | (3) | (4) | (5) |
|---|---|---|---|---|
| 8 | 2-aminobenzene-1-carboxylic acid→AMBOS | 5-hydroxy-7-sulfonaphthyl(2)-carbaminic acid-(4'-acetylamino)-phenylamide. | A | Red. |
| 9 | do | 5-hydroxy-7-sulfonaphthyl(2)-carbaminic acid propylamide. | A | Do. |
| 10 | do | 5-hydroxy-7-sulfonaphthyl(2)-carbaminic acid benzylamide. | A | Do. |
| 11 | 1-hydroxy-2-aminobenzene-4-sulfonic acid→2-(3'-methyl-4'-amino)-benzoylamino-5-hydroxynaphthalene-1,7-disulfonic acid. | 5-hydroxy-7-sulfonaphthyl(2)-carbaminic acid-(4'-benzoylamino)-phenylamide. | C | Do. |
| 12 | 1-hydroxy-2-aminobenzene-4-sulfonic acid amide→2-(3'-methyl-4'-amino)-benzoylamino-5-hydroxynaphthalene-1,7-disulfonic acid. | 5-hydroxy-7-sulfonaphthyl(2)-carbaminic acid phenylamide. | C | Do. |
| 13 | 1-hydroxy-2-amino-4-ethylsulfonylbenzene→AMBOS. | 5-hydroxy-7-sulfonaphthyl(2)-carbaminic acid-(4'-propionylamino)-phenylamide. | A | Blue-red. |
| 14 | 1-hydroxy-2-amino-4-methylsulfonylbenzene→2-(4'-methyl-3'-amino)-benzoylamino-5-hydroxynaphthalene-7-sulfonic acid. | 5-hydroxy-7-sulfonaphthyl(2)-carbaminic acid-(4'-acetylamino)-phenylamide. | A | Do. |
| 15 | 1-hydroxy-2-amino-4-methylsulfonylbenzene→AMBOS. | 5-hydroxy-1,7-disulfonaphthyl(2)-carbaminic acid-(4'-acetylamino)-phenylamide. | C | Red. |
| 16 | do | 8-hydroxy-6-sulfonaphthyl(2)-carbaminic acid-(4'-acetylamino)-phenylamide. | A | Blue-red. |
| 17 | 1-hydroxy-2-aminobenzene-4-sulfonic acid→AMBOS. | 5-hydroxy-7-sulfonaphthyl(2)-carbaminic acid-(4'-phenyl)-phenylamide. | A | Do. |
| 18 | 1-hydroxy-2-amino-4-chlorobenzene→AMBOS. | 5-hydroxy-7-sulfonaphthyl(2)-carbaminic acid methylamide. | A | Violet. |

Table—Continued

| Ex. No. | (2) | (3) | (4) | (5) |
|---|---|---|---|---|
| 19 | 1-amino-2-hydroxynaphthalene-4-sulfonic acid → AMBOS. | 5-hydroxy-7-sulfonaphthyl(2)-carbaminic acid-(4'-benzoylamino)-phenylamide. | A | Violet. |
| 20 | 1-methoxy-2-aminobenzene-4-sulfonic acid → AMBOS. | 5-hydroxy-7-sulfonaphthyl(2)-carbaminic acid-(4'-acetylamino)-phenylamide. | A | Red. |
| 21 | 1-aminobenzene-2-carboxylic acid → 2-(3'-methyl-4'-amino)-benzoylamino-5-hydroxynaphthalene-1,7-disulfonic acid. | 5-hydroxy-7-sulfonaphthyl(2)-carbaminic acid cyclohexylamide. | A | Scarlet. |
| 22 | 1-hydroxy-2-aminobenzene-4-sulfonic acid methylamide → 2-(3'-methyl-4'-amino)-benzoylamino-5-hydroxynaphthalene-1,7-disulfonic acid. | ___do___ | C | Red. |
| 23 | 2-aminobenzene-1-carboxylic acid → AMBOS. | 5-hydroxy-7-sulfonaphthyl(2)-carbaminic acid-(3'-sulfamido)-phenylamide. | A | Do. |
| 24 | 1-hydroxy-2-amino-4-methylsulfonylbenzene → AMBOS. | 5-hydroxy-7-sulfonaphthyl(2)-carbaminic acid-(3'-sulfo)-phenylamide. | B | Bordeaux. |
| 25 | ___do___ | 2-carbethoxyamino-5-hydroxynaphthalene-7-sulfonic acid. | A | Ruby red. |
| 26 | ___do___ | 2-acetylamino-5-hydroxynaphthalene-7-sulfonic acid. | A | Do. |
| 27 | ___do___ | 2-benzoylamino-5-hydroxynaphthalene-1,7-disulfonic acid. | B | Bluish red. |
| 28 | ___do___ | 2-phenylacetylamino-5-hydroxynaphthalene-7-sulfonic acid. | A | Red. |
| 29 | ___do___ | 1-chloro-2-benzoylamino-5-hydroxynaphthalene-7-sulfonic acid. | A | Bluish red. |
| 30 | ___do___ | 2-(3'-methyl-4'-amino)-benzoylamino-5-hydroxynaphthalene-7-sulfonic acid. | A | Blue-red. |
| 31 | ___do___ | 2-(4'-amino)-benzoylamino-5-hydroxynaphthalene-7-sulfonic acid. | A | Bluish red. |
| 32 | ___do___ | 2-(3'-amino)-benzoylamino-5-hydroxynaphthalene-7-sulfonic acid. | A | Do. |
| 33 | 1-hydroxy-2-amino-4-methylsulfonylbenzene → 2-(3'-methyl-4'-amino)-benzoylamino-5-hydroxynaphthalene-1,7-disulfonic acid. | 2-carbethoxyamino-5-hydroxynaphthalene-7-sulfonic acid. | B | Yellowish red. |
| 34 | ___do___ | 2-acetylamino-5-hydroxynaphthalene-7-sulfonic acid. | B | Do. |
| 35 | ___do___ | 2-carbethoxyamino-5-hydroxynaphthalene-1,7-disulfonic acid. | B | Do. |
| 36 | ___do___ | 2-acetylamino-5-hydroxynaphthalene-1,7-disulfonic acid. | B | Do. |
| 37 | ___do___ | 2-phenylacetylamino-5-hydroxynaphthalene-7-sulfonic acid. | B | Red. |
| 38 | ___do___ | 1-chloro-2-carbethoxyamino-5-hydroxynaphthalene-7-sulfonic acid. | B | Bluish red. |
| 39 | ___do___ | 2-(4'-amino)-benzoylamino-5-hydroxynaphthalene-7-sulfonic acid. | B | Blue-red. |
| 40 | ___do___ | 2-cinnamoylamino-5-hydroxynaphthalene-7-sulfonic acid. | A | Red. |
| 41 | 1-hydroxy-2-amino-4-methylsulfonylbenzene → 1-chloro-2-(3'-methyl-4'-amino)-benzoylamino-5-hydroxynaphthalene-7-sulfonic acid. | 2-carbethoxyamino-5-hydroxynaphthalene-7-sulfonic acid. | A | Bluish red. |
| 42 | ___do___ | 2-benzoylamino-5-hydroxynaphthalene-1,7-disulfonic acid. | A | Red. |
| 43 | ___do___ | 2-phenylacetylamino-5-hydroxynaphthalene-7-sulfonic acid. | A | Bluish red. |
| 44 | ___do___ | 2-phenoxyacetylamino-5-hydroxynaphthalene-7-sulfonic acid. | A | Do. |
| 45 | ___do___ | 2-(3'-methyl-4'-amino)-benzoylamino-5-hydroxynaphthalene-7-sulfonic acid. | A | Blue-red. |
| 46 | 1-hydroxy-2-amino-4-methylsulfonylbenzene → 2-(4'-methyl-3'-amino)-benzoylamino-5-hydroxynaphthalene-7-sulfonic acid. | 2-benzoylamino-5-hydroxynaphthalene-7-sulfonic acid. | A | Bluish red. |
| 47 | ___do___ | 2-carbethoxyamino-5-hydroxynaphthalene-7-sulfonic acid. | A | Red. |
| 48 | 1-hydroxy-2-amino-4-ethylsulfonylbenzene → AMBOS. | 2-acetylamino-5-hydroxynaphthalene-7-sulfonic acid. | A | Bluish red. |
| 49 | 1-hydroxy-2-amino-4-(4'-methyl)-phenylsulfonylbenzene → 2-(3'-methyl-4'-amino)-benzoylamino-5-hydroxynaphthalene-1,7-disulfonic acid. | 2-carbethoxyamino-5-hydroxynaphthalene-7-sulfonic acid. | A | Yellowish red. |
| 50 | 2-amino-5-methylsulfonylbenzene-1-carboxylic acid → AMBOS. | 2-benzoylamino-5-hydroxynaphthalene-7-sulfonic acid. | A | Red. |
| 51 | 2-amino-4-methylsulfonylbenzene-1-carboxylic acid → AMBOS. | 2-carbethoxyamino-5-hydroxynaphthalene-7-sulfonic acid. | A | Do. |
| 52 | 1-carboxymethoxy-2-amino-4-methylsulfonylbenzene → AMBOS. | ___do___ | A | Do. |
| 53 | 1-hydroxy-2-amino-4-methylsulfonylbenzene → AMBOS. | 5-hydroxy-7-sulfonaphthyl(2)-carbaminic acid dimethylamide. | A | Do. |
| 54 | ___do___ | 2-cinnamoylamino-5-hydroxynaphthalene-1,7-disulfonic acid. | A | Do. |
| 55 | 1-hydroxy-2-amino-4-methylsulfonylbenzene → 2-(3'-methyl-4'-amino)-benzoylamino-5-hydroxynaphthalene-1,7-disulfonic acid. | 2-crotonylamino-5-hydroxynaphthalene-7-sulfonic acid. | B | Do. |
| 56 | ___do___ | 2-benzoylamino-5-hydroxynaphthalene-7-sulfonic acid. | A | Do. |
| 57 | 1-carboxymethoxy-2-aminobenzene → AMBOS. | 5-hydroxy-7-sulfonaphthyl(2)-carbaminic acid-(4'-acetylamino)-phenylamide. | A | Do. |
| 58 | 3-aminonaphthalene-2-carboxylic acid → AMBOS. | ___do___ | A | Blue-red. |
| 59 | 1-hydroxy-2-amino-4-benzylsulfonylbenzene → AMBOS. | 2-carbethoxy-5-hydroxynaphthalene-1,7-disulfonic acid. | B | Bluish red. |
| 60 | 1-hydroxy-2-amino-4-cyclohexylsulfonylbenzene → AMBOS. | ___do___ | B | Do. |
| 61 | 1-hydroxy-2-aminobenzene-4-sulfonic acid → 2-(4'-methyl-3'-amino)-benzoylamino-5-hydroxynaphthalene-7-sulfonic acid. | 5-hydroxy-7-sulfonaphthyl(2)-carbaminic acid-(4'-phenyl)-phenylamide. | A | Blue-red. |
| 62 | 2-aminobenzene-1-carboxylic acid → 2-(4'-methyl-3'-amino)-benzoylamino-5-hydroxynaphthalene-7-sulfonic acid. | 2-carbethoxyamino-5-hydroxynaphthalene-7-sulfonic acid. | A | Brown-red. |
| 63 | 1-hydroxy-2-amino-4-methylsulfonylbenzene → AMBOS. | 2-carbethoxyamino-8-hydroxynaphthalene-6-sulfonic acid. | A | Bluish red. |
| 64 | 2-amino-1-hydroxy-6-chlorobenzene-4-sulfonic acid → AMBOS. | 2-hydroxynaphthalene. | A | Red. |
| 65 | 2-amino-1-hydroxybenzene-4-sulfonic acid amide → AMBOS. | ___do___ | A | Do. |
| 66 | 2-aminonaphthalene-3-carboxylic acid → AMBOS. | ___do___ | A | Do. |
| 67 | 1-amino-2-hydroxynaphthalene-4-sulfonic acid → AMBOS. | ___do___ | A | Violet. |

Table—Continued

| Ex. No. | (2) | (3) | (4) | (5) |
|---|---|---|---|---|
| 68 | 2-amino-1-hydroxybenzene-4-sulfonic acid methylamide → AMBOS. | 2-hydroxynaphthalene-6-sulfonic acid | A | Red. |
| 69 | 1-amino-2-hydroxynaphthalene-4-sulfonic acid → AMBOS. | do | A | Violet. |
| 70 | 2-amino-1-hydroxybenzene-4-sulfonic acid phenylamide → AMBOS. | 1-hydroxynaphthalene-4-sulfonic acid | A | Red. |
| 71 | 2-amino-1-hydroxy-4-methylsulfonylbenzene → 2-(4'-amino-3'-methyl)-benzoylamino-5-hydroxynaphthalene-1,7-disulfonic acid. | 2-hydroxynaphthalene-4-sulfonic acid | B | Do. |
| 72 | do | do | C | Do. |
| 73 | 2-amino-1-hydroxy-4-methylsulfonylbenzene → AMBOS. | 2-hydroxynaphthalene-3,6-disulfonic acid | B | Do. |
| 74 | do | 2-hydroxynaphthalene-6,8-disulfonic acid | B | Do. |
| 75 | do | 1-hydroxy-4-methylbenzene | A | Red-brown. |
| 76 | 1-amino-2-hydroxynaphthalene-4-sulfonic acid → AMBOS. | do | A | Brown-violet. |
| 77 | 2-amino-1-hydroxy-4-methylsulfonylbenzene → AMBOS. | 1-hydroxy-2,4-dimethylbenzene | A | Red-brown. |
| 78 | 2-amino-1-hydroxybenzene-4-sulfonic acid → AMBOS. | 1-phenyl-3-methyl-5-pyrazolone | A | Do. |
| 79 | 2-aminobenzene-1-carboxylic acid → AMBOS. | 1-phenyl-3-methyl-5-pyrazolone-3'-sulfonic acid amide. | A | Orange-brown. |
| 80 | 2-amino-1-hydroxy-4-methylsulfonylbenzene → 2-(3'-amino-4'-methyl)-benzoylamino-5-hydroxynaphthalene-7-sulfonic acid. | 2-hydroxynaphthalene | A | Red. |
| 81 | 2-amino-1-hydroxy-4-methylsulfonylbenzene → AMBOS. | acetoacetylaminobenzene | A | Orange-red. |
| 82 | do | barbituric acid | A | Do. |
| 83 | 2-aminobenzene-1-carboxylic acid → AMBOS. | do | A | Orange. |
| 84 | 1-hydroxy-2-amino-4-methylsulfonylbenzene → AMBOS. | 1-acetylamino-7-hydroxynaphthalene | A | Brown-red. |
| 85 | do | 1-(4'-hydroxy)-phenyl-3-methyl-5-pyrazolone-3'-carboxylic acid. | A | Orange. |
| 86 | 1-hydroxy-2-amino-4-methylsulfonyl-6-chlorobenzene → 2-(3'-methyl-4'-amino)-benzoylamino-5-hydroxynaphthalene-1,7-disulfonic acid. | 1-(4'-amino)-phenyl-3-methyl-5-pyrazolone | A | Do. |
| 87 | 1-hydroxy-2-aminobenzene-4-sulfonic acid methylamide → AMBOS. | 1-[4'-(4''-acetylamino)-phenyl]-phenyl-3-methyl-5-pyrazolone. | A | Red-orange. |

Formulae of representative dyestuffs set forth in the foregoing table are as follows:

(Example 8)

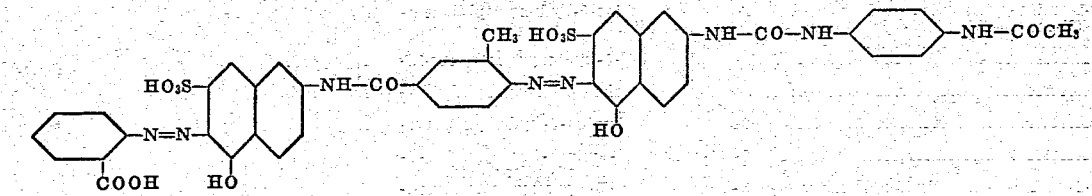

(Example 33)

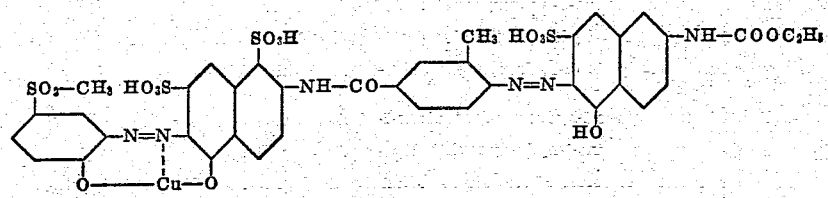

(Example 50)

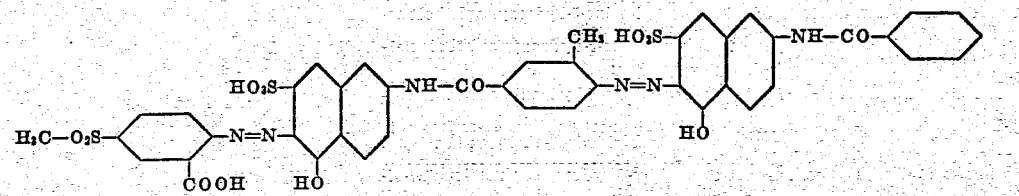

EXAMPLE 88

10 parts of prewetted cotton are entered into a dyebath which contains a solution of 0.1 part of the dyestuff obtained according to the first paragraph of Example 5 and 300 parts of lime-free water at 50°. The dyebath is heated to boiling in the course of 30 minutes and is maintained at boiling temperature for 15 minutes. During the dyeing process, 3–4 parts of sodium sulfate in the form of a concentrated aqueous solution are added to the dyebath. Upon completion of the dyeing process, the dyed material is permitted to cool to 50° in the course of 15–20 minutes while remaining in the bath; it is then rinsed and subjected to an aftertreatment with copper sulfate or with a cation-active copper complex compound which, if desired, may be basic.

Regenerated cellulose fibers are dyed in like manner. Dyeing with products which are metallized in substance, for example, the copper-containing disazo dyestuff obtained according to paragraph 2 of Example 3, is likewise carried out in the same manner; an aftertreatment of the dyeing with copper salts, particularly in combination with cation-active compounds, may here also in many cases result in improved properties.

Having thus disclosed the invention, what is claimed is:

1. A member selected from the group consisting of disazo dyestuffs which correspond to the formula

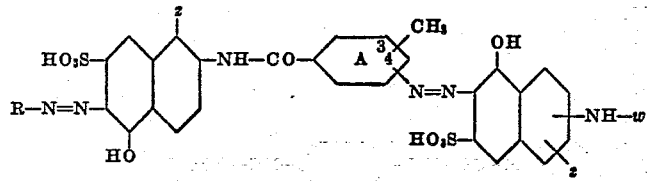

and the complex copper and nickel compounds thereof, wherein the —CH₃ on nucleus A is in one of the said positions 3 and 4 of the latter and the grouping

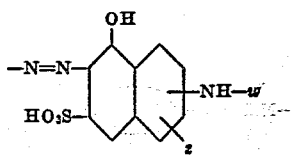

is in the other of the positions 3 and 4; R stands for a member selected from the group consisting of (a) aromatic radicals of the benzene and naphthalene series which contain in ortho-position to the azo group a substituent capable of metal-complex formation and also contain a substituent selected from the class consisting of lower alkyl sulfonyl, cyclohexylsulfonyl, benzylsulfonyl and mononuclear arylsulfonyl, and of (b) aromatic radicals of the benzene and naphthalene series which contain in ortho-position to the azo group a substituent capable of metal-complex formation but are free from substituted sulfonyl groups; z stands for a member selected from the group consisting of hydrogen, chlorine and —SO₃H; and w stands, when R contains a substitued sulfonyl group, for an acyl radical selected from the group consisting of radicals of saturated and unsaturated monocarboxylic acids of the lower aliphatic, phenyl-aliphatic and phenoxy-aliphatic series, radicals of mononuclear aromatic monocarboxylic acids, radicals of substitued carbamic acids, the substituents being chosen from the class consisting of lower alkyl, cyclohexyl, benzyl, phenyl, acetylaminophenyl, propionylaminophenyl, benzoylaminophenyl, aminosulfonylphenyl, sulfophenyl and diphenylyl residues, and stands, when R is free from substitued sulfonyl groups, for the grouping $$-CO-N\begin{matrix}R_1\\R_2\end{matrix}$$

R₁ being a member selected from the group consisting of hydrogen, lower alkyl, cyclohexyl, benzyl, phenyl, acetylaminophenyl, propionylamino phenyl, benzoylaminopenyl, aminosulfonylphenyl, sulfophenyl and diphenylyl, and R₂ being a member selected from the group consisting of hydrogen and methyl.

2. A disazo dyestuff which corresponds to the formula

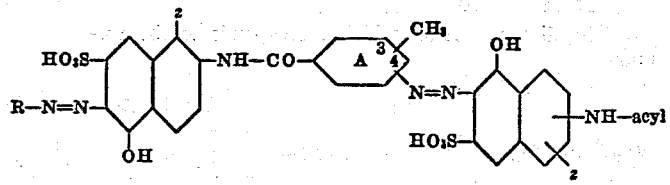

wherein the —CH₃ on the nucleus A is in one of the positions 3 and 4 of the latter and the grouping

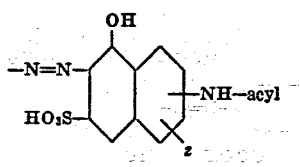

is in the other of the said positions 3 and 4; R stands for a member selected from the group consisting of aromatic radicals of the benzene and the naphthalene series which contain in ortho-position to the azo group a substitutent capable of metal-complex formation and also contain a substituent selected from the class consisting of lower alkylsulfonyl, cyclohexylsulfonyl, benzylsulfonyl and mononuclear arylsulfonyl; z stands for a member selected from the group consisting of hydrogen, chlorine and —SO₃H; and acyl stands for a member selected from the group consisting of radicals of saturated and unsaturated monocarboxylic acids of the lower aliphatic, phenyl-aliphatic and phenoxy-aliphatic series, radicals of mononuclear aromatic monocarboxylic acids, radicals of substituted carbamic acids, the substituents being chosen from the class consisting of lower alkyl, cyclohexyl, benzyl, phenyl, acetylaminophenyl, propionylaminophenyl, benzoylaminophenyl, aminosulfonylphenyl, sulfophenyl and diphenylyl.

3. The disazo dyestuff which corresponds to the formula

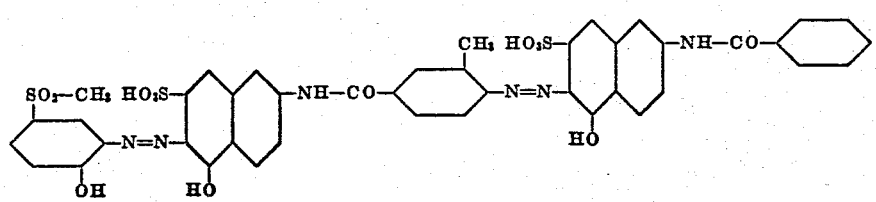

4. The disazo dyestuff which corresponds to the formula
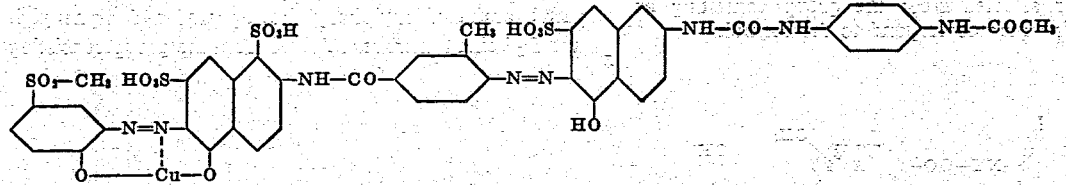
5. The disazo dyestuff which corresponds to the formula
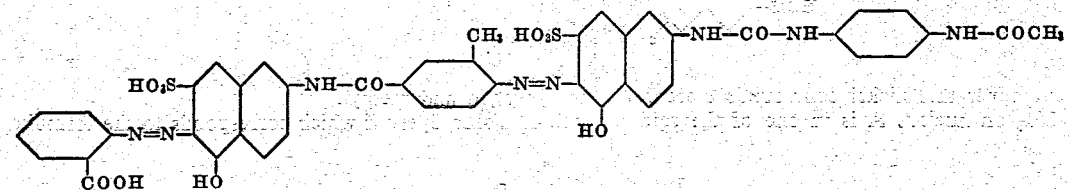
6. The disazo dyestuff which corresponds to the formula
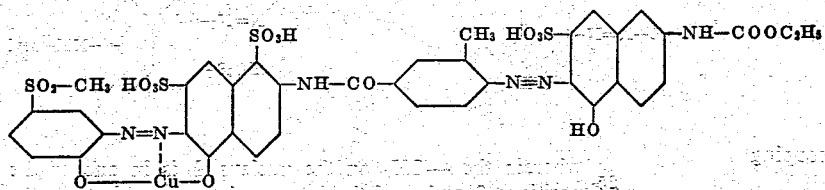
7. The disazo dyestuff which corresponds to the formula
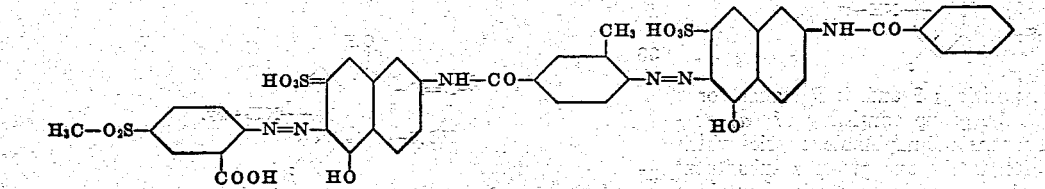
References Cited in the file of this patent
UNITED STATES PATENTS
| | | |
|---|---|---|
| 2,026,920 | Taube et al. | Jan. 7, 1936 |
| 2,623,873 | Ischer | Dec. 30, 1952 |
FOREIGN PATENTS
| | | |
|---|---|---|
| 277,756 | Great Britain | Sept. 26, 1927 |